(12) United States Patent
Minezawa et al.

(10) Patent No.: US 10,934,914 B2
(45) Date of Patent: Mar. 2, 2021

(54) UREA WATER SUPPLY SYSTEM AND CONTROL METHOD THEREFOR

(71) Applicant: ISUZU MOTORS LIMITED, Tokyo (JP)

(72) Inventors: Masanobu Minezawa, Yokohama (JP); Shinji Hara, Yamato (JP); Naofumi Ochi, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 43 days.

(21) Appl. No.: 16/344,732

(22) PCT Filed: Oct. 24, 2017

(86) PCT No.: PCT/JP2017/038284
§ 371 (c)(1),
(2) Date: Apr. 24, 2019

(87) PCT Pub. No.: WO2018/079524
PCT Pub. Date: May 3, 2018

(65) Prior Publication Data
US 2019/0271247 A1 Sep. 5, 2019

(30) Foreign Application Priority Data
Oct. 25, 2016 (JP) .............................. JP2016-208404

(51) Int. Cl.
*F01N 3/20* (2006.01)
*F01N 3/08* (2006.01)

(52) U.S. Cl.
CPC ............. *F01N 3/206* (2013.01); *F01N 3/08* (2013.01); *F01N 3/208* (2013.01); *F01N 3/2066* (2013.01);
(Continued)

(58) Field of Classification Search
CPC ........ F01N 3/206; F01N 3/208; F01N 3/2066; F01N 3/08; F01N 2610/14; F01N 2610/1486; F01N 2610/10; F01N 2610/02
See application file for complete search history.

(56) References Cited

U.S. PATENT DOCUMENTS

2007/0059222 A1* 3/2007 Satou .................... F01N 3/2066
422/177
2007/0199308 A1 8/2007 Satou et al.
(Continued)

FOREIGN PATENT DOCUMENTS

CN 102808680 A * 12/2012
CN 102947562 A 2/2013
(Continued)

OTHER PUBLICATIONS

International Search Report and Written Opinion for related International Application No. PCT/JP2017/038284, dated Dec. 12, 2017; English translation of ISR provided. 7 pages.
(Continued)

*Primary Examiner* — Matthew T Largi
(74) *Attorney, Agent, or Firm* — Procopio, Cory, Hargreaves & Savitch LLP (57) ABSTRACT

A urea water supply system which performs permission determination by a control device based on a first parameter includes a cooling water temperature sensor, and a control device is configured to be able to store a result of the permission determination, and when a system control is restarted after the system control is stopped and a stop period is elapsed, it performs a shortening setting to shorten a time required for the permission determination based on the determination result stored at a time when the system is stopped and a cooling water temperature immediately after restarting.

3 Claims, 4 Drawing Sheets

(52) U.S. Cl.
CPC ...... *F01N 2610/02* (2013.01); *F01N 2610/10* (2013.01); *F01N 2610/14* (2013.01); *F01N 2610/1486* (2013.01)

(56) References Cited

U.S. PATENT DOCUMENTS

| | | | |
|---|---|---|---|
| 2010/0095653 A1* | 4/2010 | Thiagarajan | F01N 3/208 60/286 |
| 2012/0006003 A1* | 1/2012 | Darr | F01N 3/208 60/274 |
| 2013/0061574 A1 | 3/2013 | Minezawa et al. | |
| 2015/0128570 A1 | 5/2015 | Tomita | |
| 2016/0040577 A1 | 2/2016 | Nihongi et al. | |
| 2016/0123204 A1 | 5/2016 | Furesawa | |
| 2016/0348555 A1* | 12/2016 | Tsuchiya | F01N 3/208 |
| 2017/0321582 A1 | 11/2017 | Nakao et al. | |
| 2017/0350292 A1* | 12/2017 | Tomita | F01N 9/00 |

FOREIGN PATENT DOCUMENTS

| | | |
|---|---|---|
| CN | 202832727 U | 3/2013 |
| CN | 103670629 A | 3/2014 |
| CN | 104395572 A | 3/2015 |
| CN | 105026711 A | 11/2015 |
| CN | 105026711 B | 10/2017 |
| DE | 102007000572 A1 | 7/2008 |
| JP | 2006-125331 A | 5/2006 |
| JP | 2015-161259 A | 9/2015 |
| WO | 2010/035355 A1 | 4/2010 |
| WO | 2014-199778 A1 | 12/2014 |
| WO | 2016-063697 A1 | 4/2016 |

OTHER PUBLICATIONS

Extended European Search Report for related European Application No. 17865185.7, dated Jul. 11, 2019; 5 pages.
Office Action for related CN App. No. 201780065734.X dated Aug. 4, 2020. English translation provided; 12 pages.

* cited by examiner

UREA WATER SUPPLY SYSTEM AND CONTROL METHOD THEREFOR

CROSS-REFERENCE TO RELATED APPLICATIONS

This application is a U.S. National Stage entry of PCT Application No: PCT/JP2017/038284 filed on Oct. 24, 2017, which claims priority to Japanese Patent Application No. 2016-208404, filed Oct. 25, 2016, the contents of which are incorporated herein by reference.

TECHNICAL FIELD

The present disclosure relates to a urea water supply system and a control method therefor, and more specifically, to a urea water supply system capable of injecting urea water at an early stage and a control method therefor.

BACKGROUND ART

A urea water supply system which supplies urea water to a selective reduction catalyst (SCR catalyst) provided in an exhaust passage of an engine has been proposed (see Patent Literature 1, for example). This urea water supply system raises the temperature of the urea water when the urea water freezes, calculates the time required for thawing the urea water, and injects the urea water from a urea water injection valve after the time is elapsed.

CITATION LIST

Patent Literature

[Patent Literature 1]: WO 2014-199778 A

SUMMARY

Technical Problem

The urea water supply system described above sets the time required for thawing by checking a frozen state of the urea water based on the ignition (start switch) on/off or an engine rotation speed. Therefore, the urea water cannot be injected until the engine rotation speed becomes equal to or greater than a threshold value and a time required for further thawing is elapsed from that time point, and therefore purification of nitrogen oxide in exhaust gas with the urea water as a reducing agent is delayed.

The present disclosure provides a urea water supply system and a control method therefor capable of shortening a time required for starting injection while reliably thawing urea water.

Solution to Problem

A urea water supply system according to this disclosure includes: a urea water injection valve; a tank; and a pump; and including: a temperature raising device which raises a temperature of urea water; a state acquisition device which acquires a state related to freezing of the urea water; a control device which is connected to the urea water injection valve, the temperature raising device, and the state acquisition device, wherein the temperature of the urea water is raised by the temperature raising device when the control device is activated and wherein injection by the urea water injection valve is started if a result of determination whether the injection of the urea water by the urea water injection valve is permitted is positive in the control device based on a state of the urea water acquired from the state acquisition device, the urea water supply system includes a heat generation temperature acquisition device, which acquires a heat generation temperature of the temperature raising device, wherein the control device is configured to be able to store the determination result, and after the system control on the urea water supply system including the temperature raising by the temperature raising device, the determination of the permission, and injection by the urea water injection valve is stopped and then a stop period is elapsed, when a system control is restarted from temperature raising by the temperature raising device, a shortening setting to shorten a time required for the determination of the permission is performed by the control device based on the determination result, which is stored in a time when the system control is stopped, and the heat generation temperature, which is acquired by the heat generation temperature acquisition device immediately after restarting.

In order to achieve an object described above, a control method of a urea water supply system according to this disclosure includes: raising a temperature of urea water by a temperature raising device when the urea water stored in a tank is supplied to a urea water injection valve by a pump and injected from the urea water injection valve; acquiring a state related to freezing of the urea water during temperature raising by the temperature raising device; and starting injection by the urea water injection valve when a result of determination whether injection of the urea water by the urea water injection valve is permitted is positive based on the acquired state related to the freezing, wherein, when a system control is restarted from temperature raising by the temperature raising device after the system control on the urea water supply system including the temperature raising by the temperature raising device, the determination of the permission, and injection by the urea water injection valve is stopped and a stop period is elapsed, the control method comprises: storing the determination result at a time when the system control is stopped, acquiring, a heat generation temperature of the temperature raising device is immediately after restarting, and performing a shortening setting to shorten a time required for the determination of the permission based on the stored determination result and the acquired heat generation temperature.

Advantageous Effects of the Invention

According to the present disclosure, in a case where the system control is restarted from temperature raising by the temperature raising device after the system control is stopped and the stop period is elapsed, the shortening setting to shorten the time required for the determination of the permission is performed based on the result of the determination of the permission when the system control is stopped and the heat generation temperature of the temperature raising device immediately after restarting. That is, based on the determination result at a time when the system control is stopped and the heat generation temperature immediately after restarting, it is determined whether the system control is restarted in a state where the urea water is not refreezed after being thawed, and then the shortening setting to shorten the time required for the determination of the permission is performed. Therefore, the time required for the determination of the permission can be set to the shortest time where the urea water can be reliably thawed according to the thawing situation of the urea water before stopping. This is advantageous to shorten of the time required for the start of injection while reliably thawing the urea water and it is possible to start injection of the urea water at an early stage.

DESCRIPTION OF EMBODIMENTS

Hereinafter, an embodiment of the present disclosure will be described with reference to the drawings. In the drawings, G1 indicates an exhaust gas and W1 indicates a cooling water, and further U1 indicates a urea water.

Figure 1:
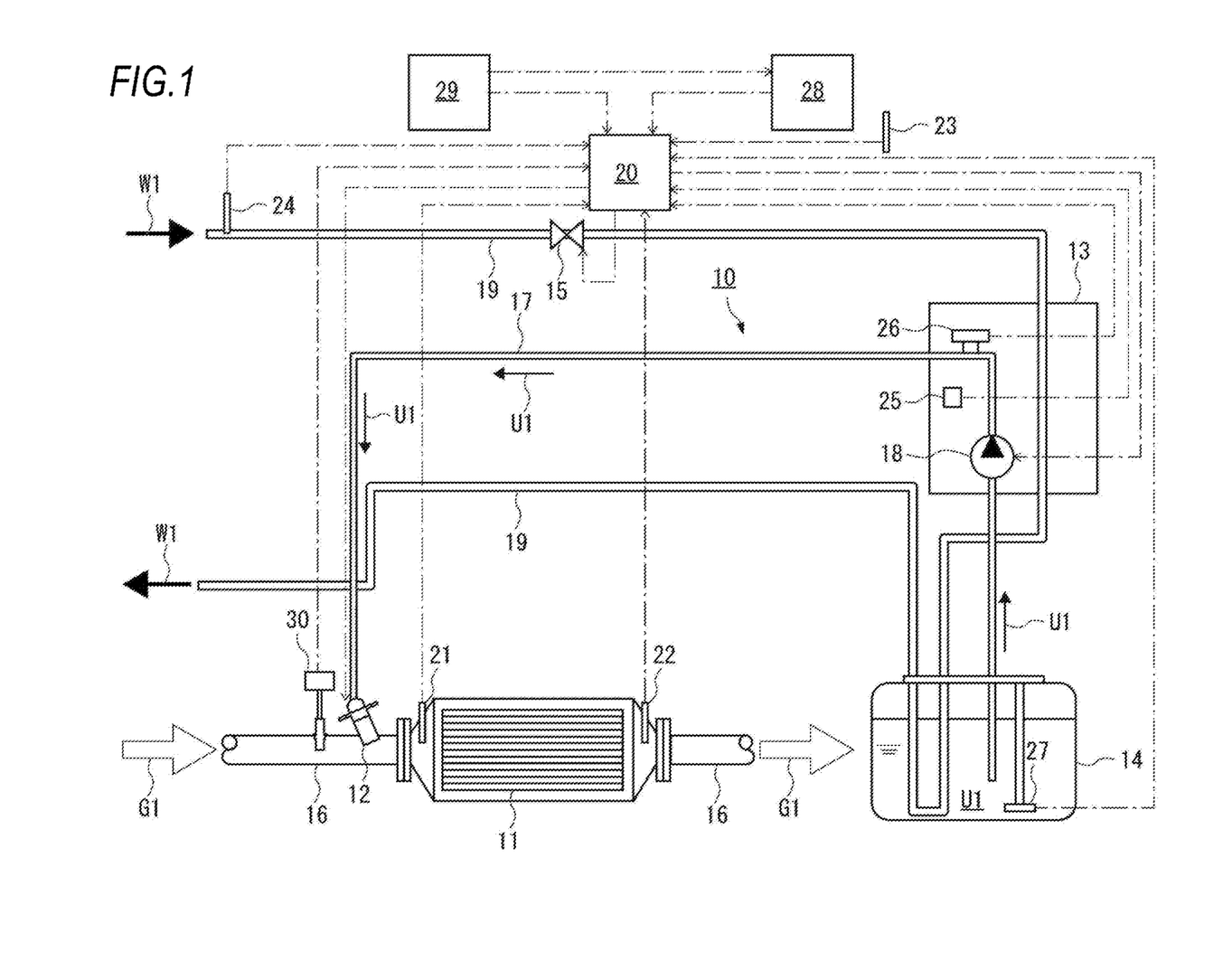
FIG. 1 is a configuration diagram illustrating an embodiment of a urea water supply system of the present disclosure.

As illustrated in FIG. 1, a urea water supply system 10 of the embodiment is a system which is incorporated in an exhaust gas purification system and supplies a urea water as a reducing agent to a selective reduction catalyst (SCR catalyst) 11.

The exhaust gas purification system is configured by the urea water supply system 10, the selective reduction catalyst 11, a control device 20, and various sensors 21 to 27. The urea water supply system 10 is configured by a urea water injection valve 12, a supply module 13, a urea water tank 14, and a coolant valve 15. The coolant valve 15 may not be provided in some cases.

The urea water injection valve 12 and the selective reduction catalyst 11 are arranged in order from an upstream side to a downstream side with respect to a flow of the exhaust gas G1 at an intermediate position of an exhaust passage 16 through which the exhaust gas G1 discharged from an engine (not illustrated) passes. Further, an ammonia slip catalyst may be provided on a downstream side of the selective reduction catalyst 11. In addition, an oxidation catalyst or a collection filter may be provided on an upstream side of the selective reduction catalyst 11.

The urea water injection valve 12, the supply module 13, and the urea water tank 14 are connected by a urea water piping 17 and the urea water U1 is supplied from the urea water tank 14 to the urea water injection valve 12 by a pump 18 provided in the supply module 13.

The urea water tank 14 and the urea water piping 17 connecting the urea water injection valve 12, the supply module 13, and the urea water tank 14 are configured to be warmed by the cooling water W1 after cooling the engine by a cooling water piping 19 and the coolant valve 15 regulates a flow rate of the cooling water W1. In the embodiment, the cooling water piping 19 disposed inside the urea water tank 14 or adjacent to the urea water piping 17 functions as a temperature raising device for raising the temperature of the urea water U1. In addition to the urea water piping 17, the urea water injection valve 12 and the pump 18 may be directly warmed by the cooling water piping 19.

The control device 20 is hardware constituted by a CPU which performs various kinds of information processing, an internal storage device capable of reading and writing a program used for performing various kinds of information processing and an information processing result, various interfaces, and the like. The control device 20 is electrically connected to the urea water injection valve 12, the pump 18, exhaust temperature sensors 21 and 22, an outside air temperature sensor 23, a cooling water temperature sensor 24, a module temperature sensor 25, a module pressure sensor 26, a tank temperature sensor 27, and a NOx sensor 30 via a signal line. Further, the control device 20 is electrically connected to an engine control device 28 for performing engine control and a battery 29 via a signal line. The control device 20 performs injection control of the urea water injection valve 12 and drive control of the pump 18 based on the connected engine control device 28 and measured values from various sensors.

Next, a control method of the urea water supply system 10 will be described. In the urea water supply system 10, when the ignition is turned on (the ignition key or the switch is turned on) and the control device 20 is activated by energization from the battery 29, the temperature rise in the urea water U1 is performed by the cooling water W1 which flows in the cooling water piping 19 after cooling the engine. Next, based on a first parameter, the control device 20 performs a determination (hereinafter, referred to as a permission determination) whether injection of urea water U1 by the urea water injection valve 12 is permitted, and then a command to permit injection of urea water U1 is sent to the urea water injection valve 12 in accordance with a result of the permission determination.

Specifically, the permission determination is configured by a temperature determination for determining whether a temperature reaches the temperature at which the urea water U1 is thawed and a time determination for determining whether a time elapsed since thawing of the urea water U1 becomes equal to or longer than a predetermined permission time. Further, when, in the permission determination, the results of the temperature determination and the time determination are positive, a command to permit injection of the urea water U1 is sent to the urea water injection valve 12. In this embodiment, thawing of the urea water U1 is started when the engine starts and the cooling water W1 starts circulating through the cooling water piping 19.

Figure 2:
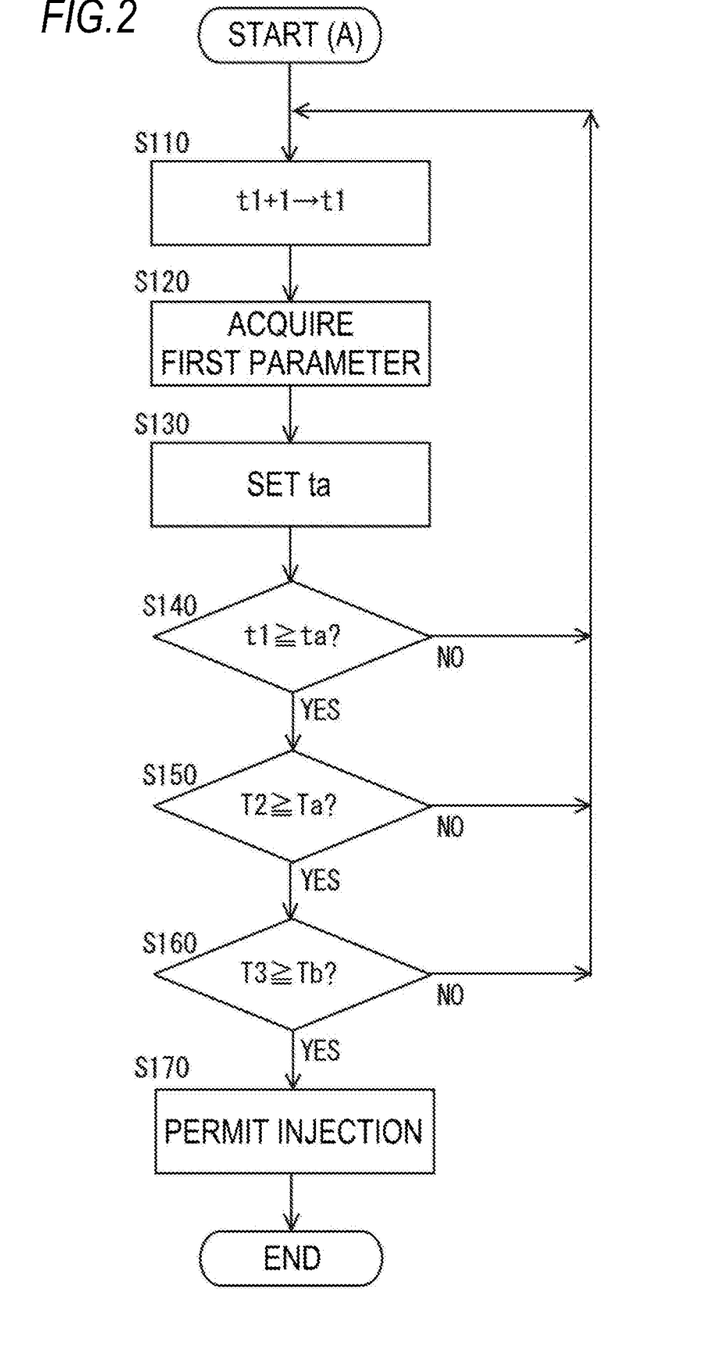
FIG. 2 is a flowchart illustrating a method related to system control in a normal state of a control method for the urea water supply system in FIG.

As illustrated in FIG. 2, the control device 20 counts a time t1 by a timer (not illustrated) provided in the control device 20 (S110). Next, the control device 20 acquires the first parameters by a state acquisition device (S120). Then, the control device 20 calculates a setting time to in accordance with an outside air temperature T1 among the first parameters (S130).

A sensor which acquires a state related to the freezing of the urea water U1 existing in the urea water supply system 10 can be exemplified as the state acquisition device and, in this embodiment, the outside air temperature sensor 23, the module temperature sensor 25, and the tank temperature sensor 27 are used as the state acquisition device.

The first parameter is a parameter indicating a state relating to the freezing of the urea water U1 existing in the urea water supply system 10. In this embodiment, the outside air temperature T1 acquired by the outside air temperature sensor 23, a module temperature T2 acquired by the module temperature sensor 25, and a tank temperature T3 acquired by the tank temperature sensor 27 are used as the first parameter. As the parameter indicating the state of the urea water U1, the pressure acquired by a pressure sensor 26 may be used as the measurement value that changes when the urea water U1 is frozen. In addition, when temperature sensors are provided in the urea water injection valve 12 or the urea water piping 17, measurement values thereof may be used.

The setting time ta is a calculated value calculated from a predetermined calculation formula or map data according to the outside air temperature T1. In this embodiment, calculation is performed using the map data.

Figure 3:
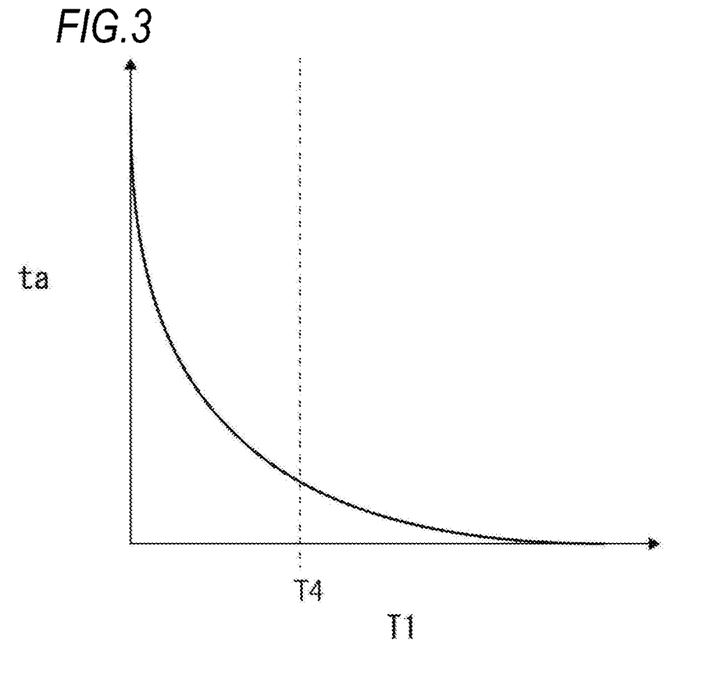
FIG. 3 is map data for calculating a set time in FIG. 2.

As illustrated in FIG. 3, the map data is obtained in advance by experiments or tests, stored in the control device 20, and read out by the control device 20. In the map data, the setting time ta has a negative relationship with the outside air temperature T1, and is set to a long time when the outside air temperature T1 is low and is set to a short time when the outside air temperature T1 is high.

In particular, the setting time ta is set to a longer time when the outside air temperature T1 becomes equal to or lower than a temperature T4 which is equal to or lower than zero degrees and at which the urea water U1 is frozen. In this way, by setting the setting time ta to be longer when the outside air temperature T1 is low and the urea water U1 is frozen and setting the setting time ta to be shorter in other cases based on the temperature T4 at which urea water U1 is frozen, it is advantageous to shorten of a time required for the time determination.

Next, the control device 20 determines whether the counted time t1 is equal to or longer than the setting time ta (S140). The determination based on the elapsed time t1 is the time determination. Since it is not possible to measure the temperature of the entire area of the urea water piping 17, the time determination is made to determine the thawing of the urea water U1 in urea water piping 17 according to the time. Next, when the counted time t1 becomes equal to or longer than the setting time ta, that is, when the time determination result becomes positive, the control device 20 determines whether the module temperature T2 among the acquired first parameters is equal to or higher than a predetermined first threshold value Ta (S150). Then, the control device 20 determines whether the tank temperature T3 among the first parameters become equal to or higher than a predetermined second threshold value Tb (S160). The determination of comparing those two temperatures of the urea water U1 and the threshold values is the temperature determination.

Each of the first threshold value Ta and the second threshold value Tb is a threshold value obtained in advance by experiments or tests and stored in the control device 20 and is set to a temperature at which it can be determined that the urea water U1 is thawed.

When the counted time t1 becomes equal to or longer than the setting time to (S140: YES) and both the module temperature T2 and the tank temperature T3 are equal to or higher than the threshold values (S150: YES and S160: YES), that is, when the result of the time determination becomes positive and the result of the temperature determination becomes positive, the control device 20 sends a command to permit injection of the urea water injection valve 12 (S170). When the temperature determinations (S150 and S160) and the time determinations (S130 and S140) described above are the permission determinations and each determination result becomes positive, a command to permit injection of the urea water injection valve 12 is sent.

As described above, after the command to permit the injection of the urea water injection valve 12 is sent, the injection control of the urea water U1 is performed by the control device 20 based on the measurement value of the NOx sensor 30 or the like.

As the permission determination, by determining whether the urea water U1 is thawed by two items of the temperature determination and the time determination, it is possible to determine a state in which the urea water U1 is reliably thawed.

In particular, even when the module temperature T2 and the tank temperature T3 become equal to or higher than the threshold values in the temperature determination and the determination result becomes positive (S150: YES and S160: YES), the urea water U1 may not be thawed over the entire urea water piping 17 and there are cases where the urea water U1 is frozen locally in the urea water piping 17. In this regard, using the time determination is advantageous for determining of the state where the urea water U1 existing in the urea water supply system 10 is all thawed.

The temperature determination and the time determination may be performed in parallel and the two determinations of the temperature determination may also be performed in parallel. In other words, S130, S140, S150, and S160 described above may be processed in parallel.

The system controls (S110 to S170) on the urea water supply system 10 described above is configured to be performed when the ignition is turned on and the control device 20 is activated. That is, both the temperature determination (S150 and S160) and the time determination (S130 and S140) are performed again after the system control is stopped and a stop period Δt is elapsed. Therefore, the urea water U1 can be injected in a state where the urea water U1 is reliably thawed and the injection of the urea water U1 is delayed by the time required for the permission determination.

Therefore, the urea water supply system 10 of this embodiment is provided with the cooling water temperature sensor 24 as a heat generation temperature acquisition device and the control device 20 is configured to be able to store the result of permission determination. When the system controls (S110 to S170) are stopped and are performed again from the temperature rise using the engine cooling water W1 after the stop period Δt is elapsed, based on the result of the permission determination when the system control is stopped and a cooling water temperature T5 acquired by the cooling water temperature sensor 24 immediately after restarting, a shortening setting to shorten the time required for the permission determination is performed by the control device 20.

More specifically, the shortening setting is a setting for omitting the time determination in the permission determination.

Figure 4:
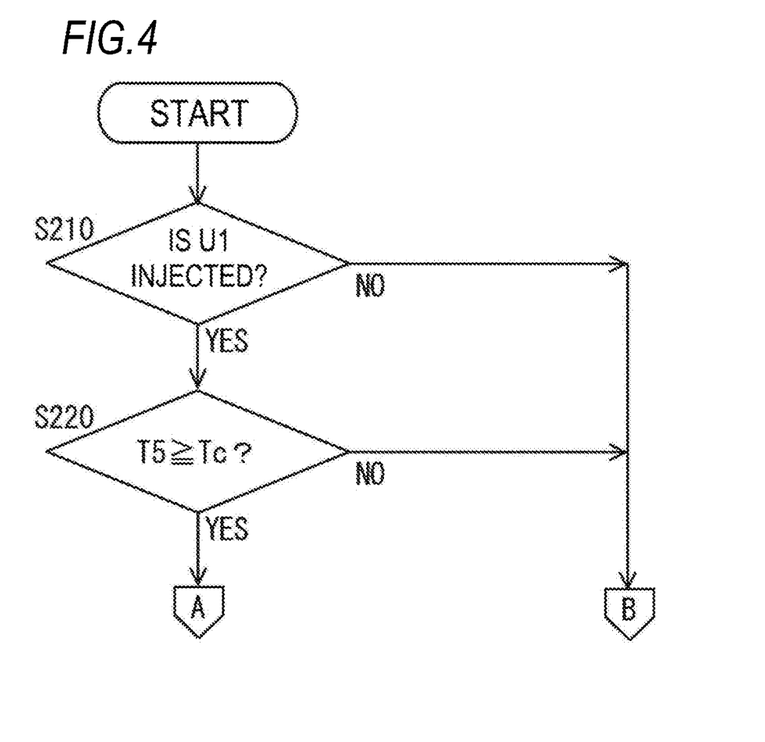
FIG. 4 is a flowchart illustrating a method related to shortening setting of the control method for the urea water supply system in FIG. 1.

Details of the control method will be described below. The shortening setting illustrated in FIG. 4 is performed before the system control described above is performed when the ignition is turned on and the control device 20 is activated by energization of the battery 29. By the shortening setting, it is selected whether to perform normal system control illustrated in FIG. 2 or system control illustrated in FIG. 5 in which the time required for the permission determination is shortened.

As illustrated in FIG. 4, the control device 20 determines whether the result of the permission determination when the system control is stopped is positive (S210). Next, the control device 20 determines whether the cooling water temperature T5 acquired by the cooling water temperature sensor 24 immediately after the system control is restarted is equal to or higher than a predetermined third threshold value Tc (S220).

Figure 5:
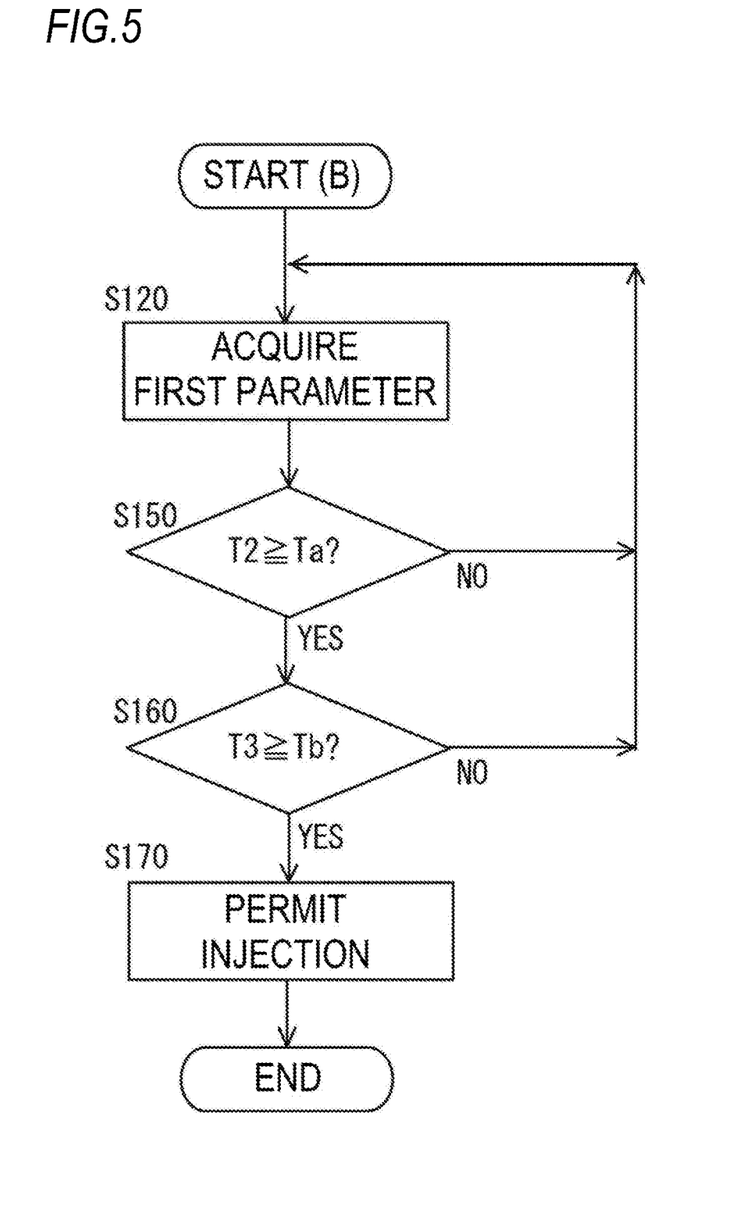
FIG. 5 is a flowchart illustrating a method related to system control in which a time required for permission determination is shortened of the urea water supply system in FIG. 1.

The result of the permission determination is either one of the result of the determination of both the temperature determination and the time determination in FIG. 2 and the determination result of only the temperature determination in FIG. 5.

The cooling water temperature T5 indicates a heat generation temperature of the temperature raising device configured by the cooling water piping 19, which is the temperature immediately after the system control resumes. Since the cooling water temperature T5 uses the temperature after cooling the engine, it is preferable that the cooling water temperature sensor 24 be disposed at a position where the temperature of the cooling water W1 released from the engine can be measured. The term "immediately after restarting" referred to herein means immediately after the control device 20 is activated and immediately after the ignition is turned on.

The third threshold value Tc is set to a temperature at which it is possible to determine a state where the urea water U1 is not frozen again.

Specifically, it is preferable that the third threshold value Tc be set to be higher than the outside air temperature T1 and it is more preferable that the third threshold value Tc be set to a temperature within a temperature range of the cooling water W1 during driving of the engine. That is, a case where the cooling water temperature T5 immediately after restarting is equal to or higher than the third threshold value Tc indicates a case where the stop period Δt is a short time or a case where the cooling water temperature T5 is maintained during the stop period Δt.

According to the two determinations described above, when the determination result at a time when the system control is stopped is positive and the cooling water temperature T5 is equal to or higher than the third threshold value Tc, the system control illustrated in FIG. 5 is performed in which the shortening setting to shorten the time required for the permission determination is made. On the other hand, when the result at a time when the system control is stopped is negative or the cooling water temperature T5 is lower than the third threshold value Tc, normal system control illustrated in FIG. 2 is performed.

As illustrated in FIG. 5, in the system control in which the shortening setting to shorten the time required for the permission determination is made, the time determinations (S110, S130, and S140) are omitted from the normal system control. In a case where the determination result at a time when the system control is stopped is positive, the state is a state after the urea water U1 existing in the urea water supply system 10 is thawed. When the cooling water temperature T5 is equal to or higher than the third threshold value Tc, the state is a state where the urea water U1 is thawed and the thawed state is maintained.

As described above, in a case where the system control is restarted after the system control is stopped and the stop period Δt is elapsed, the shortening setting to shorten the time required for the permission determination is performed based on the result of the permission determination when the system control is stopped and the cooling water temperature T5 immediately after restarting. That is, based on the determination result (S170 in FIGS. 2 and S170 in FIG. 5) and the cooling water temperature T5, it is determined whether the system control is restarted in a state where the urea water U1 is not refreezed after being thawed, and then the shortening setting to shorten the time required for the permission determination is performed. Therefore, the time required for the permission determination can be set to the shortest time where the urea water U1 can be reliably thawed according to the thawing situation of the urea water U1 before stopping. This is advantageous to shorten of the time required for the start of injection while reliably thawing the urea water U1 and it is possible to start injection of the urea water U1 at an early stage. Along with this, the injection control of the urea water U1 can be performed at an early stage based on the measurement value of the NOx sensor 30, so nitrogen oxides can be reliably purified.

Further, when the result of the determination of the permission is positive, injection by the urea water injection valve 12 is permitted. Thus, whether or not the injection by the urea water injection valve 12 is permitted can also be used instead of the determination result. Whether or not the injection is permitted is different from the occurrence or nonoccurrence of injection of the urea water injection valve 12 based on the measurement value of the NOx sensor 30 or the like.

In the embodiment, the time required for the permission determination is not shortened only by the cooling water temperature T5, that is, the engine state, and the time required for the permission determination is shortened by using the determination result at a time when the system control which is the previous thawing condition of the urea water U1 is stopped.

Therefore, since it is possible to determine thawing against partial freezing of the urea water U1 occurring when determining based only on the engine state, it is advantageous for avoiding of situations such as pressure abnormality of the urea water U1 and inappropriate injection quantity.

In a case of shortening the time required for the permission determination, only the time determination in the temperature determination and the time determination in the permission determination is omitted. This shortens the time required for the permission determination close to the safety side, which is advantageous for avoiding permission of injection with the urea water U1 frozen even when the time is shortened.

As the temperature raising device, an electric heater may be used in place of the temperature raising device constituted by the cooling water piping 19 through which the cooling water W1 after cooling the engine described above passes. In a case of the electric heater, it is preferable to measure the heat generation temperature based on the current and the voltage flowing through the electric heater.

This application is based on Japanese Patent Application No. 2016-208404) filed on Oct. 25, 2016, the contents of which are incorporated herein by reference.

INDUSTRIAL APPLICABILITY

According to the present disclosure, it is advantageous to shorten of a time required for start of injection while reliably thawing urea water and it is possible to start injection of the urea water at an early stage.

REFERENCE SIGNS LIST

10: urea water supply system
12: urea water injection valve
13: pump module
14: tank
18: pump
19: cooling water piping (temperature raising device)
20: control device
22, 25, 27: state acquisition device
23: heat generation temperature acquisition device
U1: urea water
W1: cooling water

The invention claimed is:

1. A urea water supply system comprising:
a urea water injection valve;
a tank;
a pump;
a heater which raises a temperature of urea water;
a first sensor which acquires a state related to freezing of the urea water;
a controller which is connected to the urea water injection valve, the heater, and the first sensor, and
a second sensor which acquires a heat generation temperature of the heater,
wherein the temperature of the urea water is raised by the heater when the controller is activated and wherein injection by the urea water injection valve is started if a result of a determination whether the injection of the urea water by the urea water injection valve is permitted is positive in the controller based on a state of the urea water acquired from the first sensor,
wherein the controller is configured to be able to store the determination result, and
in a case where a system control on the urea water supply system is restarted after the system control on the urea water supply system including the temperature raising by the heater, the determination of the permission, and injection by the urea water injection valve is stopped and then a stop period is elapsed;
if the result of the dtermination at the time when the system control is stopped is negative or if the heat generation temperature acquired by the second sensor immediately after restarting is less than a predetermined threshold value, the determination of the permission is configured by;
a temperature dtermination to determine whether the temperature of the urea water reaches a temperature to thaw; and
a time determination to determine whether an elapsed time since the start of the temperature raising by the heater is equal to or longer than a predetermined permisssion time; and
if the result of determination result at the time when the system control is stopped is positive and the heat generation temperature acquired by the second sensor immediately after restarting is equal to or higher than a predetermined threshold value, the determination of the permission is configured by the temperature determination without the determination.

2. The urea water supply system according to claim 1, wherein
the heater is configured by a cooling water piping through which cooling water after cooling an engine passes and configured such that a temperature of each of the urea water injection valve, the tank, and the pump is raised by the cooling water, and
the second sensor is configured by a cooling water temperature sensor for acquiring a water temperature of the cooling water.

3. A control method of a urea water supply system comprising:
raising a temperature of urea water by a heater when the urea water stored in a tank is supplied to a urea water injection valve by a pump and injected from the urea water injection valve;
acquiring a state related to freezing of the urea water during temperature raising by the heater; and
acquiring a state related to a heat generation temperature of the heater;
starting injction by the urea water injection valve when a result of a determination whether injection of the urea water by the urea water injection valve is permitted is positive based on the acquired state related to the freezing;
when a system control on the urea water supply system is restarted after the system control on the urea water supply system including the temperature raising by the heater, the determination of the permission, and injection by the urea water injection valve is stopped and then a stop period is elapsed;
storing the determination result at at time when the system control is stopped,
if the result of determination at the time when the system control is stopped is negative or if the heat generation temperature acquired immediately after restarting is less than a predetermined threshold value, the determination of the permission is configured by:
a temperature determination to determine whether the temperature of the urea water reaches a temperature to thaw; and
a time determination to determine whether an elapsed time since start of the temperature raising by the heater is equal to or longer than a predetermined permission time; and
if the result of determination result at the time when the system control is stopped is positive and the heat generation temperature acquired immediately after restarting is equal to or higher than a predetermined threshold value, the determination of the permission is configured by the temperature determination without the time determination.

* * * * *